United States Patent [19]

Moriguchi et al.

[11] Patent Number: 5,223,937
[45] Date of Patent: Jun. 29, 1993

[54] INK JET RECORDING APPARATUS AND METHOD WITH DRIVE CONTROL DEPENDENT ON AN IMAGE SIGNAL RECEIVING FREQUENCY

[75] Inventors: Haruhiko Moriguchi, Yokohama; Toshimitsu Danzuka, Tokyo; Yasushi Miura, Kawasaki, all of Japan

[73] Assignee: Canon Kabushiki Kaisha, Tokyo, Japan

[21] Appl. No.: 647,274

[22] Filed: Jan. 29, 1991

[30] Foreign Application Priority Data

Feb. 2, 1990 [JP] Japan .................................. 2-022185

[51] Int. Cl.$^5$ .......................... H04N 1/32; B41J 2/05
[52] U.S. Cl. ......................... 358/296; 346/1.1; 346/140 R; 358/468
[58] Field of Search .............. 346/140, 1.1; 358/296, 358/438, 434, 486, 442, 468

[56] References Cited

U.S. PATENT DOCUMENTS

| | | |
|---|---|---|
| 4,313,124 | 1/1982 | Hara . |
| 4,318,134 | 3/1982 | Partridge ........................ 358/296 X |
| 4,345,262 | 8/1982 | Shirato et al. . |
| 4,459,600 | 7/1984 | Sato et al. . |
| 4,463,359 | 7/1984 | Ayata et al. . |
| 4,549,222 | 10/1985 | Fogaroli ........................ 358/296 |
| 4,558,333 | 12/1985 | Sugitani et al. . |
| 4,702,630 | 10/1987 | Igi ................................ 358/296 X |
| 4,719,472 | 1/1988 | Arakawa ........................ 346/140 R |
| 4,723,129 | 2/1988 | Endo et al. . |
| 4,740,796 | 4/1988 | Endo et al. . |
| 4,760,462 | 7/1988 | Ogawa . |
| 4,860,034 | 8/1989 | Watanabe ........................ 346/140 |
| 4,866,462 | 9/1989 | Watanabe ........................ 346/140 |
| 5,072,303 | 12/1991 | Silverberg ........................ 358/296 |

FOREIGN PATENT DOCUMENTS

| | | |
|---|---|---|
| 3235759 | 4/1983 | Fed. Rep. of Germany . |
| 59-123670 | 7/1984 | Japan . |
| 59-138461 | 8/1984 | Japan . |
| 209166 | 9/1986 | Japan . |
| 0007555 | 1/1987 | Japan . |
| 62-267164 | 11/1987 | Japan . |
| 2166235 | 4/1986 | United Kingdom . |

*Primary Examiner*—Joseph W. Hartary
*Attorney, Agent, or Firm*—Fitzpatrick, Cella, Harper & Scinto

[57] ABSTRACT

Disclosed in an ink jet recording apparatus capable of providing high quality images in a stable manner for image signals of different transfer rates. A detector detects the receiving rate of an image signal supplied to the ink jet recording apparatus, and at least one of driving voltage, driving current, pulse duration, driving frequency and driving signal wave form is modified according to the detected receiving rate of the image signal.

39 Claims, 8 Drawing Sheets

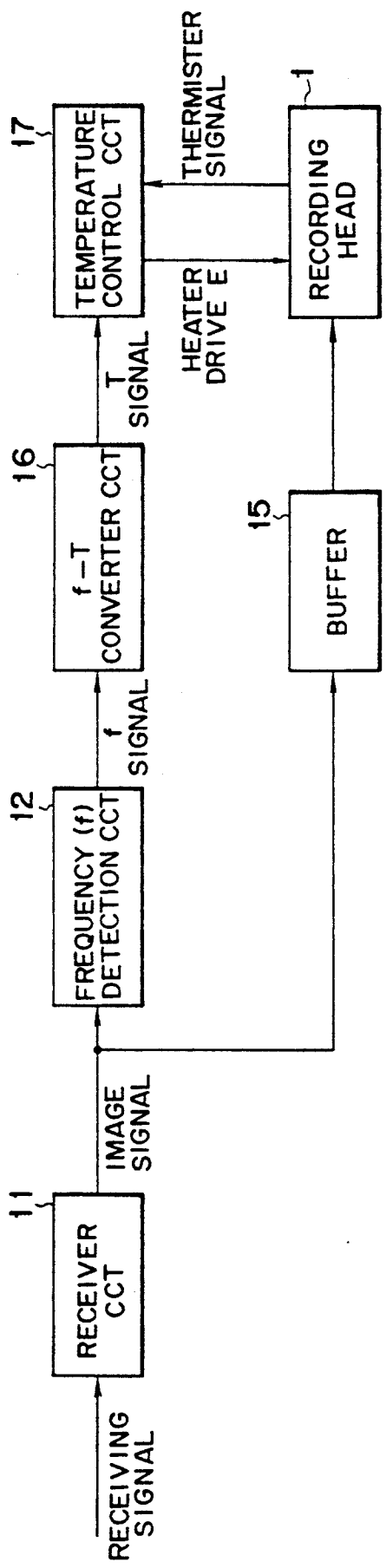
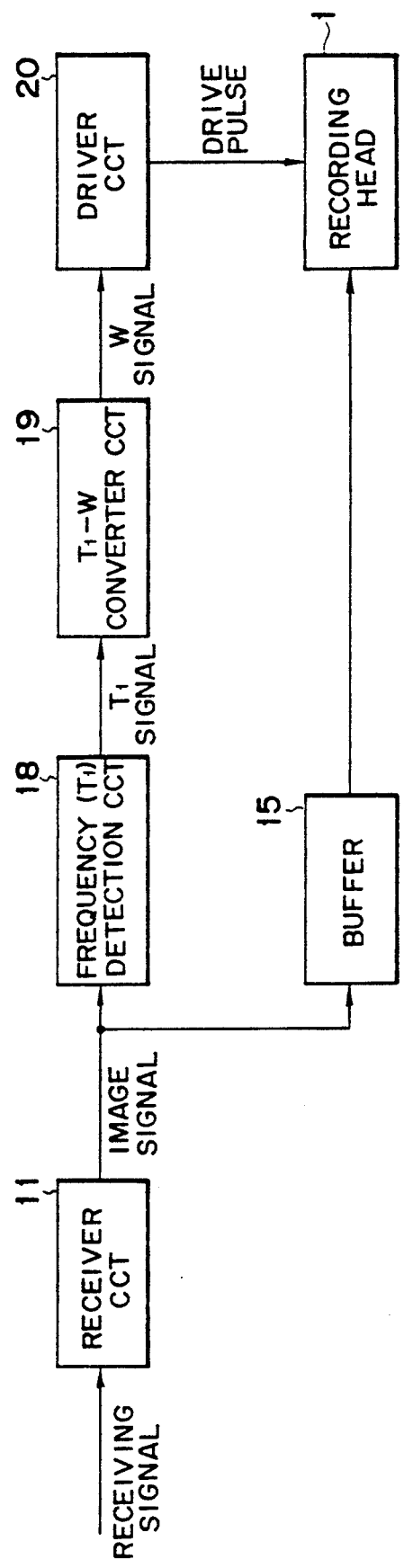

INK JET RECORDING APPARATUS AND METHOD WITH DRIVE CONTROL DEPENDENT ON AN IMAGE SIGNAL RECEIVING FREQUENCY

BACKGROUND OF THE INVENTION

1. Field of the Invention

The present invention relates to an ink jet recording apparatus having a function as facsimile, a copying machine or a printer, a composite apparatus having these functions, or an ink jet recording apparatus utilized as output equipment for example of a work station.

2. Related Background Art

Ink jet recording apparatuses have been developed and commercialized actively in recent years because of various advantages, and are known in various types such as based on ink discharge utilizing a piezoelectric element or utilizing ink bubbles generated by an electrothermal converting element such as a heat-generating resistor.

In an ink jet recording apparatus of the recording method utilizing the electrothermal converting element, a voltage or current pulse is supplied, in response to the image signal, to said converting element to generate thermal energy, thereby inducing a state change in the ink such as membrane boiling. A bubble is generated by said state change, and ink is discharged toward the recording material by the force of said bubble. The characteristics of bubble generation and discharge of the ink are dependent on the physical properties, for example, viscosity, of the ink, and therefore vary, in general, with the temperature thereof. For this reason, there is provided temperature control means as disclosed for instance in U.S. Pat. No. 4,719,472, for controlling the ink temperature within a certain range.

Also, the state of bubble generation is dependent on the voltage, current and duration of the pulse applied to the electrothermal converting element, so that these parameters are selected at optimum values according to the resistance or the surface characteristics of said electrothermal converting element.

A high image quality can be obtained in a stable manner by controlling the driving conditions in an optimum range as explained above.

However, with the progress of system integration, there is often encountered a situation where the same ink jet recording apparatus is used not only as a printer but also is output equipment of a facsimile apparatus or a copying machine, with respectively different transfer rates of the image signal. For example, an ink jet recording apparatus may have a printer mode in which the image signal is received at every 500 μsec. and a facsimile mode in which the image signal is received at every 10 msec.

Such different receiving rates of the image signal varies the recording speed, thereby also causing a change in the aforementioned optimum driving conditions, so that the conventional recording apparatus is unable to provide stable recorded images.

Also, in the compressed image transmission as in the facsimile apparatus, the above-mentioned difficulty is encountered even for the same receiving rate, as the effective image signal receiving rate varies if the image compression rate is different.

SUMMARY OF THE INVENTION

In consideration of the foregoing, an object of the present invention is to provide an ink jet recording apparatus capable of providing high-quality images in a stable manner.

Another object of the present invention is to provide an ink jet recording apparatus capable of providing high-quality images in a stable manner even when the receiving rate of the image signal varies.

Still another object of the present invention is to provide an ink jet recording apparatus capable of providing high-quality images in a stable manner even when the recording rate of the image signal varies.

The above-mentioned objects can be attained, according to the present invention, by an ink jet recording apparatus for forming an image by discharging liquid droplets toward a recording material from a small discharge opening in response to an input image signal, comprising drive control means for controlling a recording head according to the receiving rate or recording rate of said image signal.

The present invention enables achievement of high-quality images in a stable manner, by controlling the drive conditions for liquid droplet discharge in an optimum state, according to the receiving or recording rate of the image signal.

BRIEF DESCRIPTION OF THE DRAWINGS

FIG. 5 is a block diagram of a control circuit of the second embodiment;

FIG. 6 is a block diagram of a control circuit of a third embodiment;

DETAILED DESCRIPTION OF THE PREFERRED EMBODIMENTS

Now the present invention will be discussed in detail by embodiments thereof shown in the attached drawings.

Embodiment 1

Figure 1:
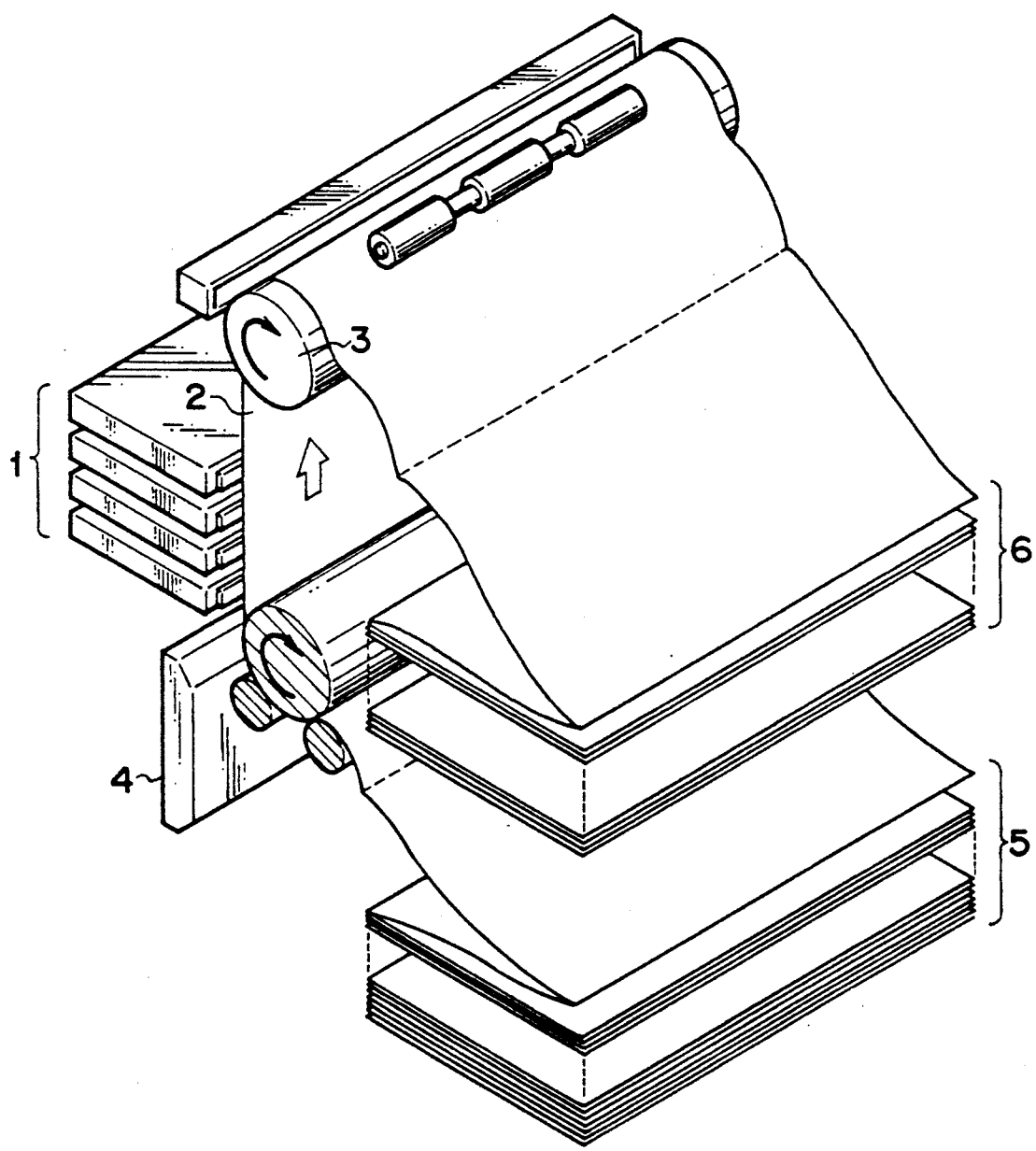
FIG. 1 is an external perspective view of a recording apparatus in which the present invention is applicable.

FIG. 1 is an external perspective view of a recording apparatus employed in the present embodiment, wherein shown are a so-called full-line recording head 1; a recording sheet 2; a drive roller 3 for transporting the recording sheet; a recovery unit 4 for effecting a recovery process on the recording head 1; a sheet feeding unit 5; and a sheet discharge unit 6.

The drive roller 3 and the recording head 1 are driven by an unrepresented control circuit, in synchronization with the receiving rate of an image signal. The recording head 1 is provided with about 4,600 discharge openings of 20 μm in height and 20 μm in width each, arranged with a pitch of 400 dpi, and electrothermal converting elements (heat-generating resistors) are provided respectively corresponding to said discharge openings.

Recording head 1 effects recording of characters or an image by generating bubbles in the ink by the heat generated by the heat-generating resistors and discharging the ink toward the recording sheet from the discharge openings of the means by thus generated bubbles. As the heat-generating resistor provided in each discharge opening is significantly smaller than the piezoelectric element employed in the conventional ink jet printer, the above-mentioned ink jet recording head 1 can achieve a high-density arrangement of the discharge openings, thereby providing a high-quality recorded image, and has advantages of high speed, low noise level, etc.

Referring to FIG. 1, the recording head 1 is composed of four head blocks for respectively discharging 4-color inks of black (Bk), cyan (C), magenta (M) and yellow (Y). The discharging characteristics of liquid droplets of said recording head 1 are shown in FIG. 2.

Figure 2:
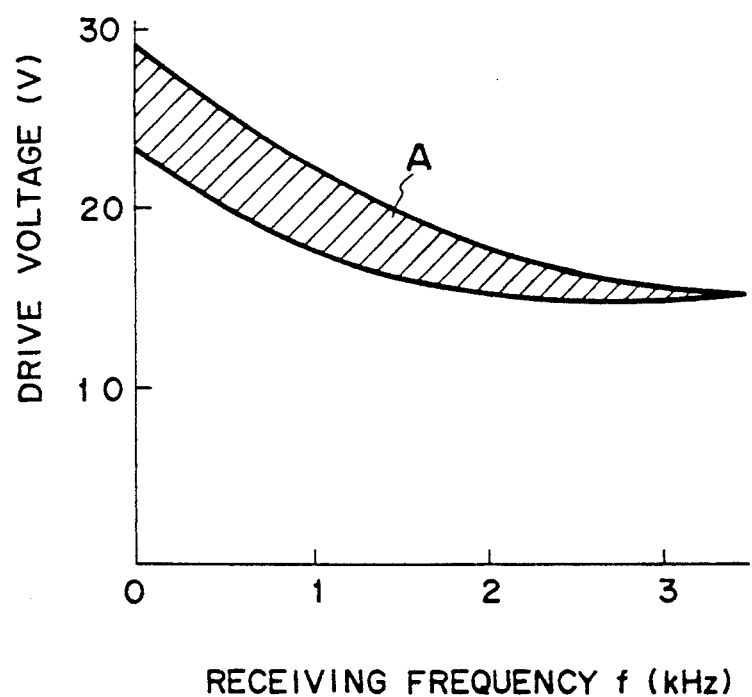
FIG. 2 is a characteristic chart showing a first embodiment of the present invention.

Referring to FIG. 2, the abscissa indicates the receiving frequency of the image signal, and the recording elements are driven based on said receiving frequency. The ordinate indicates the optimum value of the driving voltage V to be applied to each recording element, determined for a condition of a pulse duration of 10 $\mu$sec. in the present embodiment.

In FIG. 2, the optimum driving condition is indicated by a hatched area A. With a voltage below said area A, the ink discharge becomes unstable principally because of insufficient bubble generating power. On the other hand, with a voltage above said area A, the temperature of the electrothermal converting elements becomes excessively high so that the generation and contraction of a bubble cannot be realized in a stable manner. Thus, drawbacks result such as unstable image quality and an excessively high temperature leading to deterioration of the electrothermal converting elements.

Consequently, when the ink jet recording apparatus is used in the printer mode with a receiving frequency for the image signal of 2 kHz, the recording elements have to be driven with a driving voltage of 15-18 V. On the other hand, in the facsimile mode with a receiving frequency of 0.1 kHz, there is required a driving voltage of 23-29 V.

Figure 3:
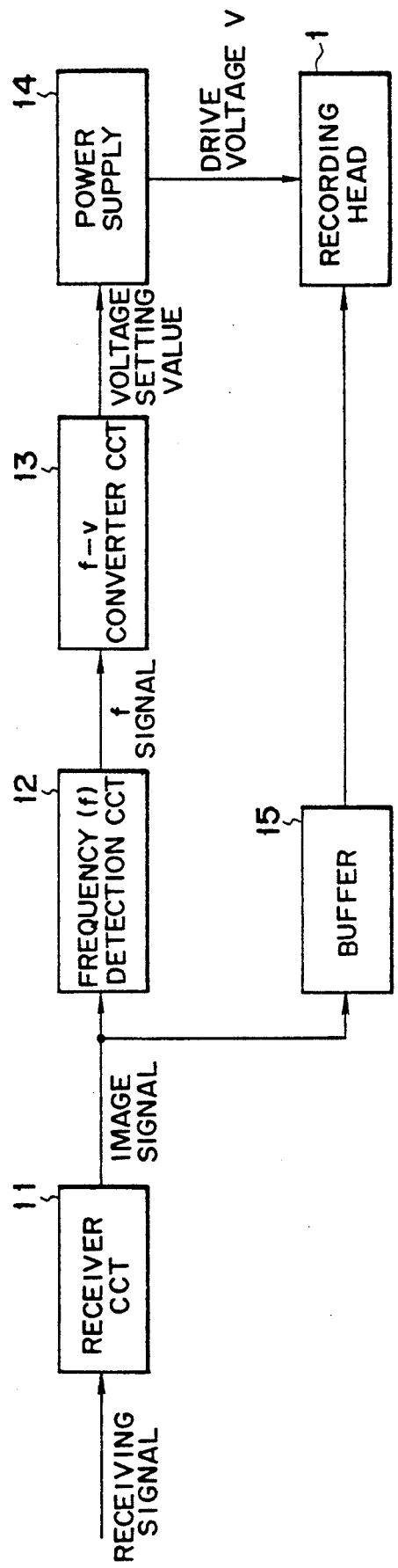
FIG. 3 is a block diagram of a control circuit of the first embodiment.

Therefore, the present embodiment employs a control circuit as shown in FIG. 3 for providing the recording head 1 with an optimum driving voltage V corresponding to the receiving frequency f, thereby providing recorded images of high quality both in the printer mode and in the facsimile mode.

Referring to FIG. 3, a receiving circuit 11 receives an external signal through a communication line connected thereto and releases an image signal. Receiving circuit 11 transmits the received signal if it is image data as in the case of a facsimile, or develops the received signal into image data if the received signal is code data as in the case of a printer signal. A frequency detection circuit 12, receiving the image signal, detects the reception frequency by determining the reciprocal of the time required for the entry of an image signal of a scanning line, and releases said frequency as an f signal.

Said f signal is converted by an f-V converting circuit 13 into a predetermined voltage setting value, and is sent to a power source 14. Said f-V converting circuit 13 is so designed to release an optimum driving voltage in response to the detected f signal, based on the discharge characteristics of the recording head 1 as shown in FIG. 2, and more specifically based on a correspondence shown in Tab. 1.

TABLE 1

| Reception frequency f (kHz) | 0.1 | 0.3 | 0.5 | 0.7 | 1.0 | 1.5 | 2.0 | 3.0 |
|---|---|---|---|---|---|---|---|---|
| Drive voltage (V) | 25 | 23 | 22 | 21 | 20 | 18 | 17 | 16 |

The power source supplies the recording head 1 with the optimum driving voltage V corresponding to the voltage setting value from the f-V converting circuit 13. A buffer 15 sends the image signal supplied from the receiving circuit 11 after storage of each scanning line. The recording head 1 receives the optimum driving voltage V according to the image signal supplied from the buffer 15, thereby effecting the image recording corresponding to said image signal.

In this embodiment, when the recording apparatus functions in the facsimile mode, the f detecting circuit 12 detects 0.1 kHz as the reception frequency of the image signal, so that, as will be understood from Tab. 1, the power source 14 supplies the recording head 1 with 25 V as the optimum driving voltage V. On the other hand, in the function in the printer mode, 2 kHz is detected as the reception frequency, so that 17 V is supplied as the optimum driving voltage V. In the present embodiment, the reception frequency (reception rate) of the image signal corresponds to the recording frequency (recording speed).

As explained in the foregoing, as the present embodiment provides the recording head 11 with the optimum driving voltage V corresponding to the reception frequency f, a high-quality image can be obtained independently from the reception frequency of the image signal, namely both in the printer mode and in the facsimile mode.

Embodiment 2

In the following there will be explained a second embodiment of the present invention, with reference to FIGS. 4 and 5.

The optimum driving conditions of the recording head also vary with the controlled temperature of the head and the ink. Stable images can therefore be obtained also by varying the controlled temperature T according to the reception frequency f. In the present embodiment, therefore, for the purpose of temperature control, a thermistor is mounted on a circuit board of the recording head, and a heater is mounted on a heat sink.

Figure 4:
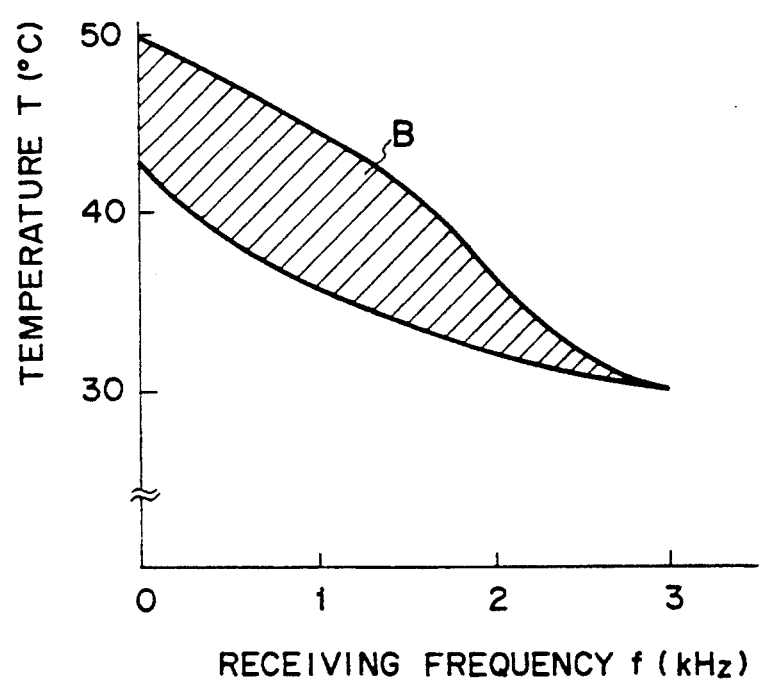
FIG. 4 is a characteristic chart showing a second embodiment of the present invention.

FIG. 4 shows the droplet discharge characteristics of the recording head 1, indicating the optimum head temperature T in the ordinate as a function of the reception frequency f of the image signal in the abscissa. As will be understood from FIG. 4, the optimum temperature control range varies depending on the reception frequency f, even for the same conditions of a driving voltage of 20 V, and a pulse duration of 20 $\mu$sec. For example, the optimum temperature range is 32° to 37° C. for a reception frequency of 2 kHz, and 42° to 49° C. for a reception frequency of 0.1 kHz.

Thus, the present embodiment employs a control circuit as shown in FIG. 5, for effecting the recording at an optimum head temperature T corresponding to the reception frequency f, thereby providing recorded images of high quality in a stable manner, both in the printer mode and in the facsimile mode.

In FIG. 5, the same components as those in the first embodiment shown in FIG. 3 are represented by the same numbers and will not be explained further. The f signal released from the f detecting circuit 12 is converted by an f-T converting circuit 16 into a T signal, which is supplied to a temperature control circuit 17. Said f-T converting circuit 16 releases the optimum head temperature signal T corresponding to the detected f signal based on the droplet discharge characteristics of the recording head 1 shown in FIG. 4, and more specifically based on the correspondence shown in Tab. 2:

TABLE 2

| Reception frequency f (kHz) | 0.1 | 0.3 | 0.5 | 0.7 | 1.0 | 1.5 | 2.0 | 3.0 |
|---|---|---|---|---|---|---|---|---|
| Head temperature T (°C.) | 45 | 43 | 42 | 41 | 40 | 38 | 34 | 31 |

The temperature control circuit 17 provides the heater mounted on the recording head 1 with a heater driving voltage E, based on the received T signal and a thermistor signal received from the recording head corresponding to the temperature thereof. Thus, the recording head 1 is controlled to a temperature corresponding to said T signal, and the recording operation is started after the completion of said temperature control. In the present embodiment, about 15 seconds are required from the detection of the reception frequency f by the f detecting circuit 12 to the completion of temperature control.

In the present embodiment, when the recording apparatus functions in the facsimile mode, the reception frequency is 0.1 kHz, so that the temperature-control circuit 17 controls the head temperature to 45° C. as shown in Tab. 2. On the other hand, in the function in the printer mode, the reception frequency is 2 kHz so that the head temperature is controlled to 34° C.

As explained in the foregoing, the present embodiment controls the temperature of the recording head 1 according to the reception frequency f, thereby providing high-quality images in a stable manner regardless of the reception frequency of the image signal, namely both in the printer mode and in the facsimile mode.

Also, in this embodiment, the reception frequency (reception rate) of the image signal corresponds to the recording frequency (speed).

Embodiment 3

The present invention is also applicable when the time required for receiving the image signal varies from scanning line to line. For example, in the G3 mode of the facsimile transmission, the time required for receiving the image signal of a scanning line varies depending on the compression rate. Stated differently, the reception frequency (reception rate) of the image signal does not correspond to the recording frequency (speed). However, high-quality images can be obtained in a stable manner by the control of the driving conditions according to said time, namely recording frequency (speed).

Basically, the optimum driving conditions can be determined by converting the reception frequency, shown in FIGS. 2 and 4, into a period Tl. More specifically, f can be replaced by Tl in the f-V converting circuit 13 shown in FIG. 3 or in the f-T converting circuit 16 shown in FIG. 5 to obtain a converted value. In the present embodiment, as the period Tl varies within a range from 5 to 80 msec according to the compression rate of the image signal, the duration W of the driving pulse is controlled within a range from 8 to 10 μsec.

FIG. 6 shows a control circuit of the present embodiment, wherein the same components as those in FIG. 3 are represented by the same numbers and will not be explained further. A signal Tl released from a Tl detecting circuit 18 is converted by a Tl-W converting circuit 19 into a W signal which is supplied to a driving circuit 20. Said Tl-W converting circuit 19 provides the recording head 1 with a head driving pulse of an optimum duration W corresponding to the detected Tl signal.

As explained in the foregoing, the present embodiment sets the optimum pulse duration according to the recording frequency (speed) even when the compression rate of the image signal varies, thereby providing high-quality images in a stable manner.

OTHER EMBODIMENTS

In the foregoing embodiments there have been raised the driving voltage, head temperature and driving pulse width as the examples of driving conditions, but other parameters may also be utilized such as the driving current, driving frequency or driving signal wave form. Examples of the driving signal wave form can be those shown in FIG. 4 in U.S. Pat. No. 4,463,359. Also, a more effective control can be achieved by suitably combining these driving conditions.

Also, in the foregoing embodiments, the reception frequency f or the reception period Tl is detected from the image signal itself by means of the f detecting circuit 12 or the Tl detecting circuit 18 for regulating the driving conditions, but the driving conditions may also be set according to the transmission rate (reception rate) set in the hand shake mode for example in the facsimile transmission. The selection of the driving conditions according to the detection of the set reception rate enables achievement of high-quality images in a stable manner as in the foregoing embodiments.

In case the driving conditions are set according to the reception rate as explained above, the recording speed (reception frequency of the image signal) varies if the compression rate of the image signal varies from line to line as in the third embodiment, even for a constant reception rate. However, since the recording speed is more strongly influenced by the reception rate than by the compression rate, the above-mentioned effects can be sufficiently attained by determining the driving conditions according to the reception rate, even if the compression rate fluctuates.

Furthermore, though the foregoing embodiments have been limited to the full-line type recording head, the present invention is also applicable to a serial type recording head. In such a case the time required for receiving the image signal of lines to be recorded is detected by a main scanning motion of the recording head, and the driving conditions are selected according to said receiving time (receiving rate).

Also, the control of the present invention may be realized by a software process utilizing a CPU, in which case a reduction in the magnitude of circuitry may be attained.

The present invention brings about excellent effects particularly in a recording head, utilizing thermal energy for achieving ink discharge from the discharge opening.

As to its representative structure and principle, for example, one practiced by use of the basic principle disclosed in, for example, U.S. Pat. Nos. 4,723,129 and 4,740,796 is preferred. This system is applicable to either of the so-called on-demand type and continuous type. Particularly, the case of the on-demand type is effective because, by applying at least one driving signal which gives rapid temperature elevation exceeding nucleus boiling corresponding to the recording information on electothermal converters arranged corresponding to the sheets or liquid channels holding liquid (ink), thermal energy is generated at the electrothermal converters to effect film boiling at the heat acting surface of the recording head. Consequently the bubbles within the liquid (ink) can be formed corresponding one by one to the driving signals. By discharging the liquid (ink) through an opening for discharging by growth and shrinkage of the bubble, at least one droplet is formed. By making the driving signals input pulse shapes, growth and shrinkage of the bubble can be effected instantly and adequately to accomplish more preferable discharging of the liquid (ink) particularly excellent in response characteristics. As the driving signals of such a pulse shape, those as disclosed in the U.S. Pat. Nos. 4,463,359 and 4,345,262 are suitable. Further excellent recording can be performed by the use of conditions described in the U.S. Pat. No. 4,313,124 of the invention concerning the temperature elevation rate of the above-mentioned heat acting surface.

As the structure of the recording head, in addition to the combined structures of the discharging orifice, liquid channel, electrothermal converter (linear liquid channel or rectangularly bent liquid channel) as disclosed in the above-mentioned patents, the structure by the use of the U.S. Pat. Nos. 4,558,333 or 4,459,600 disclosing a structure having the heat acting portion arranged in the flexed region is also included in the present invention. In addition, the present invention also can be effectively made as the structure disclosed in Japanese Patent Laid-open Application Sho 59-123670 which discloses a structure using a slit common to a plurality of electrothermal converters as the discharging portion of electrothermal converter, or the Japanese Patent Laid-open Application Sho 59-138461 which discloses a structure having an opening for absorbing a pressure wave of heat energy corresponding to the discharging portion.

Furthermore, as the recording head of the full line type having a length corresponding to the maximum width of a recording medium that can be recorded by the recording device, either the structure that satisfies its length by combination of a plurality of recording heads as disclosed in the above-mentioned patents or the structure as one recording head integrally formed may be used, and the present invention can exhibit the effects as described above effectively.

In addition, the present invention is effective for a recording head of the freely exchangeable chip type which enables electrical connection to the main device or ink supply from the main device by being mounted thereon, or for the case by the use of a recording head of the cartridge type provided integrally on the recording head itself.

Also, addition of a restoration means for the recording head, an auxiliary means, for example, provided as the structure of the recording device of the present invention is preferable, because the effect of the present invention can be further stabilized. Specific examples of these may include capping means, cleaning means, pressurization or suction electrothermal converters, other heating elements or preliminary heating means, and combinations thereof. It is also effective for achieving stable recording to perform a preliminary discharge mode which performs ink discharge separate from that for recording.

Furthermore, the present invention is extremely effective for not only the recording mode of a primary color such as black but also for the recording mode with at least one of a plurality of different colors or full color by color mixing, regardless of whether the recording head is either integrally constructed or composed of plural units.

Furthermore, the ink jet recording apparatus of the present invention may be employed not only for an image output terminal for information processing equipment such as a computer but also as a copying apparatus combined for example with a reader or a facsimile apparatus with transmitting and receiving functions.

The present invention includes all the combinations mentioned above. For example, if the main unit providing the recording information has the function of a facsimile and the function of a copying machine, word processor, electronic typewriter or ordinary printer, the above-explained control means allows provision of appropriate images in different receiving modes.

Figure 7:
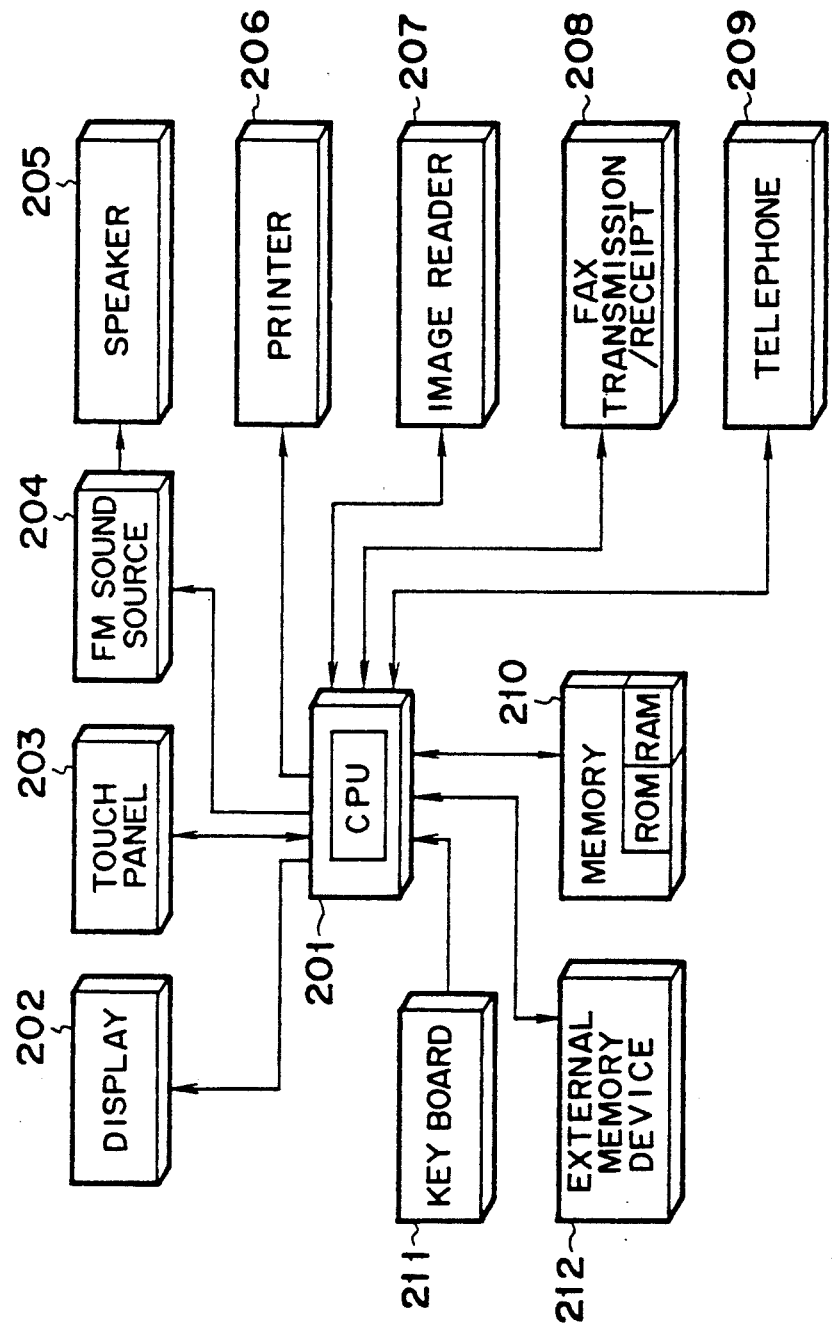
FIG. 7 is a block diagram showing the schematic structure of an information processing apparatus in which the present invention is applied.

FIG. 7 is a block diagram showing the schematic structure of an information processing apparatus having the functions of a word processor, personal computer, facsimile apparatus and copying apparatus, in which the recording apparatus of the present invention is applied.

A control unit 201 for controlling the entire apparatus is equipped with a CPU such as a microprocessor and I/O ports for sending various control signals and data signals to different units and receiving similar signals therefrom. A display unit 201 serves to display various menus, text information and image data read by an image reader 207. A pressure-sensitive transparent touch panel 203, provided on the display unit 202, is used for entering an item or a coordinate position, displayed on said display unit 202, by pressing the surface of said panel for example with a finger.

An FM sound source unit 204 effects frequency modulation on music information, prepared in advance for example with a music editor and stored in a memory 210 or an external memory device 212 in the form of digital data. An electrical signal from the FM sound source 204 is converted into audible sound by a speaker unit 205. A printer unit 206 employs the recording apparatus of the present invention, as the output terminal for the word processor, personal computer, facsimile apparatus and copying apparatus.

An image reader unit 207, for photoelectrically reading an original document, is provided in the transport path thereof and serves to read the original documents to be copied or transmitted in the facsimile transmission. A facsimile transmission/reception unit 208 effects facsimile transmission of the original data read by the image reader unit 207 and reception of the facsimile signals transmitted from outside and has an interface function with external equipment. A telephone unit 209 has ordinary telephone functions and other telephone functions such as message recording.

A memory unit 210 includes a ROM for storing a system program, a manager program, other application programs, character fonts and dictionaries, and a RAM for storing application programs loaded from an external memory 212, text information and video signals.

A keyboard 211 is used for entering text information and various commands.

An external memory device 212, utilizing a floppy disk or a rigid disk, is used for storing text information, music or audio information, and user application programs.

Figure 8:
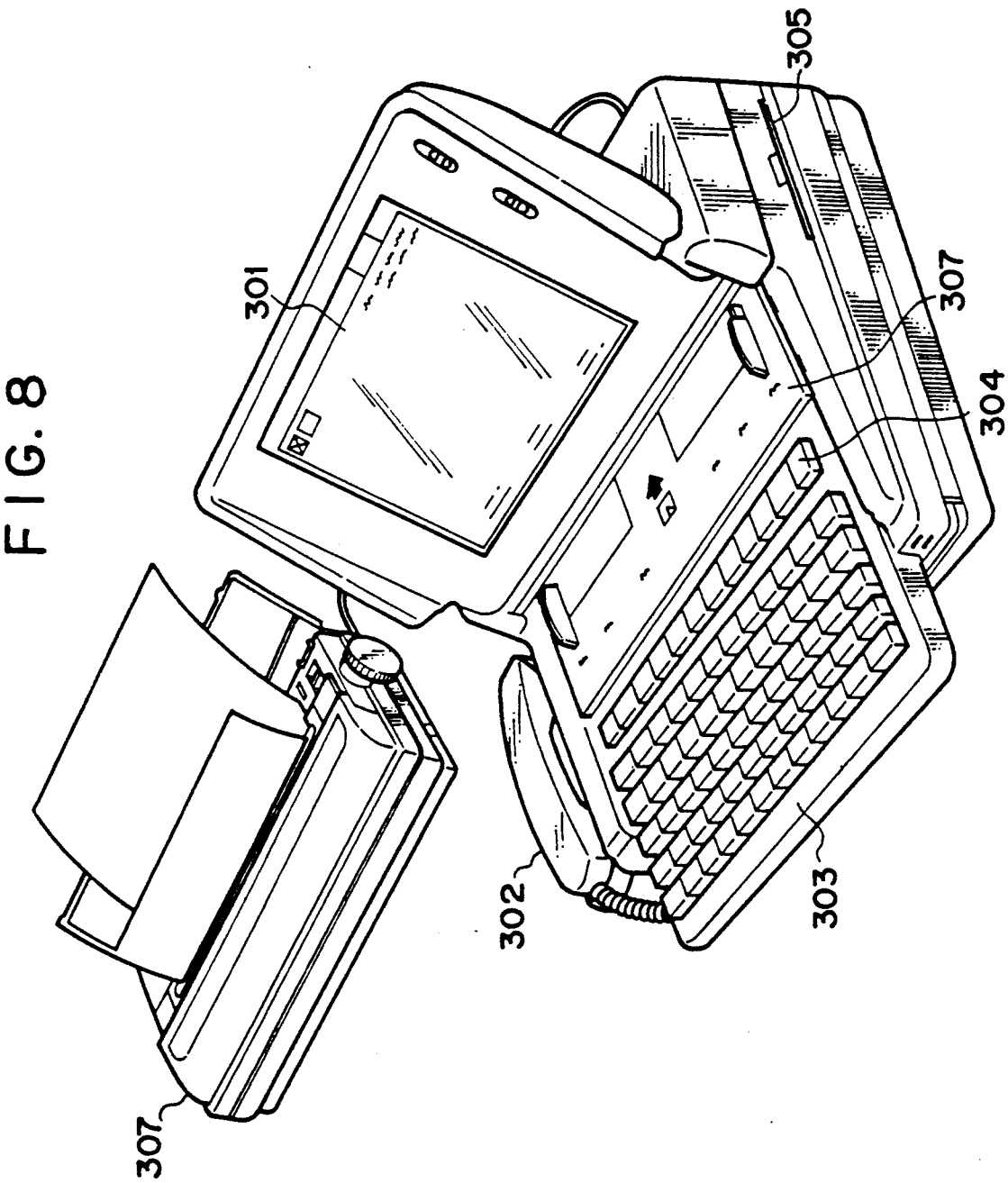
FIGS. 8 and 9 are external perspective views of the information processing apparatus shown in FIG. 7.

FIG. 8 is an external view of the information processing apparatus shown in FIG. 7.

A flat panel display 301, composed for example of a liquid crystal display, is used for displaying various menus, graphic information and text information. On said display 301 there is provided a touch panel 203 for entering, by pressing for example with a finger, coordinates and displayed items. A handset 302 is used when the apparatus functions as a telephone unit. A keyboard 303 is detachably connected to the main body through a cable, and is used for entering various text information and data. Keyboard 303 is provided with various function keys. A slot 305 is provided for inserting a floppy disk into the external memory device 212.

An original stacker 306, for placing the original document to be read by the image reader 207, and the read original document is discharged from the rear part of the apparatus. An ink jet printer is used for recording the facsimile reception.

The above-mentioned display 202 may be composed of a cathode ray tube, but is preferably composed of a flat panel display such as a liquid crystal display utilizing ferroelectric liquid crystals in order to achieve compactness, small thickness and light weight.

When the above-explained information processing apparatus functions as a personal computer or a word processor, the information entered from the keyboard 211 is processed in the control unit 201 according to predetermined programs, and the processed data are printed as an image by the printer 206.

When it functions as a facsimile receiver, the facsimile information entered from the fax transmission/reception unit 208 through the communication line is processed in the control unit 201 according to predetermined programs, and the processed data are printed as an image by the printer 206.

When it functions as a copying apparatus, the original document is read by the image reader 207, and the read data are released as an image through the control unit 201 and the printer 206. Also, when it functions as a facsimile transmitter, the data of the original document read by the image reader 207 are subjected to a transmission process in the control unit 201 according to a predetermined program, and are supplied to the fax transmission/reception unit 208 to the communication line.

Figure 9:
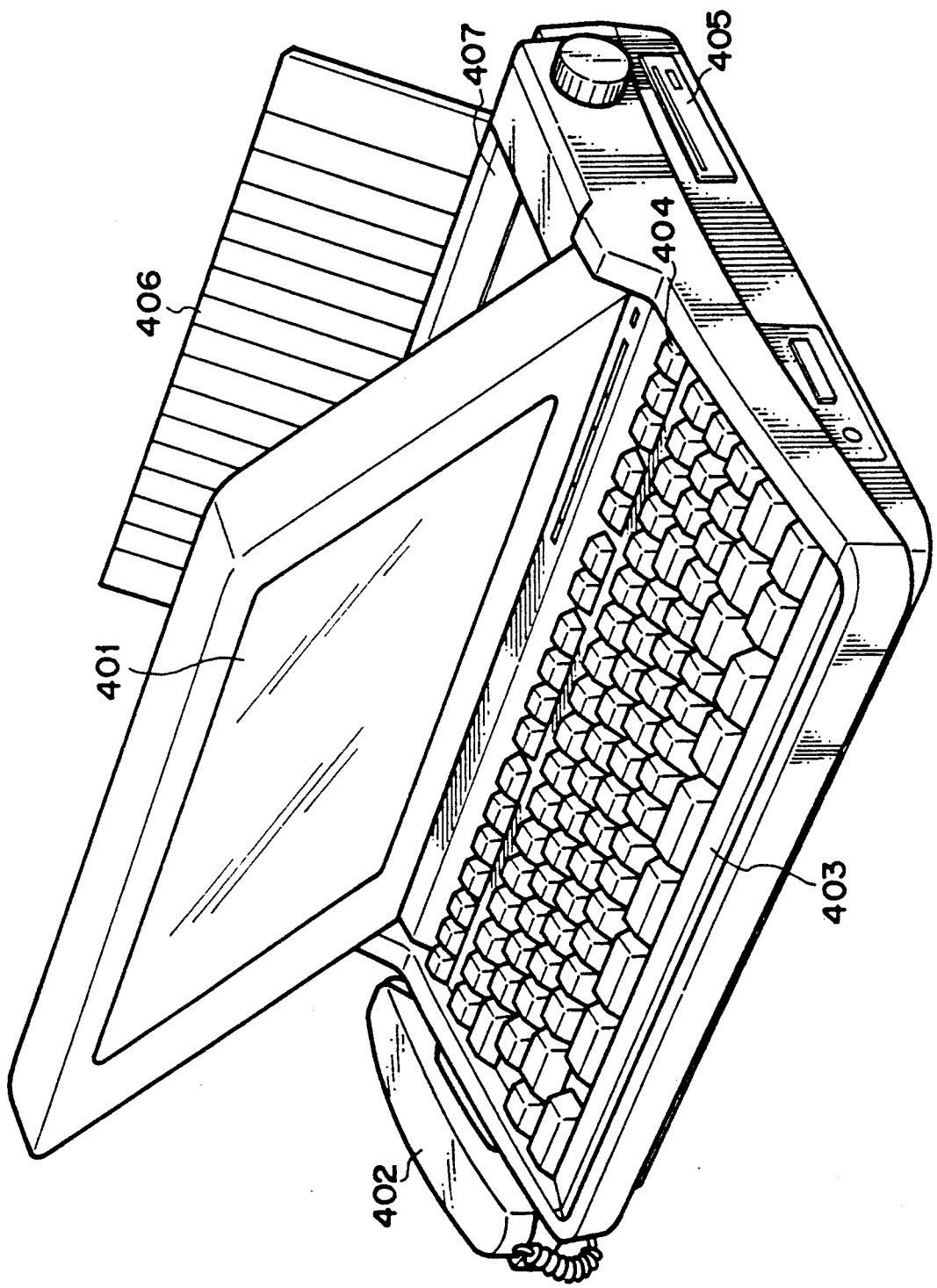

The above-explained information processing apparatus may be constructed as an integral unit incorporating the ink jet printer as shown in FIG. 9, for attaining improved portability. In FIG. 9 equivalent components to those shown in FIG. 8 are represented by the same numbers.

The application of the recording apparatus of the present invention to the above-explained multifunctional information processing apparatus allows improvement of the performance thereof, as said recording apparatus can provide high-quality images with high speed and low noise.

As explained in the foregoing, the present invention controls the recording head at the optimum driving conditions according to the receiving rate of the image signal, thereby providing high quality recorded images in a stable manner.

We claim:

1. An ink jet recording apparatus for effecting image recording with a recording head for discharging ink from discharge openings on the basis of a drive signal, said apparatus comprising:
   reception means for receiving an image signal;
   reception rate detecting mean for detecting the receiving rate of the image signal received by said reception means; and
   drive control means for controlling a recording head according to the receiving rate detected by said detecting means.

2. An apparatus according to claim 1, wherein said drive control means comprises means for varying the drive signal for driving the recording head, according to the receiving rate.

3. An apparatus according to claim 2, wherein said drive control means comprises means for varying at least one of voltage, current, pulse width, frequency and signal wave form of the drive signal for driving the recording head, according to the receiving rate.

4. An apparatus according to claim 1, wherein said drive control means comprises means for varying the temperature of the recording head, according to the receiving rate.

5. An apparatus according to claim 1, wherein the recording head comprises a plurality of discharge openings; and further comprising thermal energy generating means respectively corresponding to said discharge openings for inducing a state change in ink by heat thereby discharging the ink from a respective discharge opening and forming a liquid droplet based on the state change.

6. An apparatus according to claim 5, wherein said thermal energy generating means comprises heat energy generating resistors.

7. An apparatus according to claim 1, further comprising a communication line connected to said reception means for transmitting the image signal to said reception means.

8. An apparatus according to claim 1, further comprising means for effecting recording operations in at least one of a facsimile mode and a printer mode.

9. An apparatus according to claim 8, wherein the receiving rate in the facsimile mode is lower than that in the printer mode.

10. An apparatus according to claim 1, wherein the recording head effects color image recording by discharging inks of plural colors.

11. An apparatus according to claim 1, wherein said recording head discharges ink by generating thermal energy on the basis of a drive signal, and said drive control means performs a drive control in such a manner that energy supplied to said recording head may be reduced when the detected receiving rate is high.

12. An ink jet recording apparatus for effecting image recording with a recording head for discharging ink from discharge openings by generating thermal energy on the basis of a drive signal, said apparatus comprising:
   reception means for receiving an image signal;
   recording frequency detecting means for detecting the recording frequency for driving a recording head by the image signal received by said reception means; and
   drive control means for controlling driving of the recording head in such a manner that energy supplied to the recording head may be reduced when the recording frequency detected by said detecting means is high.

13. An apparatus according to claim 12, wherein said drive control means comprises means for varying the drive signal for driving the recording head, according to the recording frequency.

14. An apparatus according to claim 13, wherein said drive control means comprises means for varying at least one of voltage, current, pulse width, frequency and signal wave form of the drive signal for driving the recording head, according to the recording frequency.

15. An apparatus according to claim 12, wherein said drive control means comprises means for varying the temperature of the recording head, according to the recording frequency.

16. An apparatus according to claim 12, wherein the recording head comprises a plurality of discharge openings; and further comprising thermal energy generating means respectively corresponding to said discharge openings for inducing a state change in ink by heat thereby discharging the ink from a respective discharge opening and forming a liquid droplet based on the state change.

17. An apparatus according to claim 16, wherein said thermal energy generating means comprises heat energy generating resistors.

18. An apparatus according to claim 12, further comprising a communication line connected to said reception means for transmitting the image signal to said reception means.

19. An apparatus according to claim 12, further comprising means for effecting recording operations in at least one of a facsimile mode and a printer mode.

20. An apparatus according to claim 19, wherein the receiving rate in the facsimile mode is lower than that in the printer mode.

21. An apparatus according to claim 12, wherein the recording head effects color image recording by discharging inks of plural colors.

22. A recording method for use with a recording head for discharging ink from discharge openings, comprising steps of:
receiving an image signal;
detecting the receiving rate of the image signal; and
controlling a recording head according to the detected receiving rate.

23. A method according to claim 22, wherein said controlling step comprises controlling a drive signal for driving the recording head, according to the receiving rate.

24. A method according to claim 22, wherein said controlling step comprises varying the temperature of the recording head, according to the receiving rate.

25. A method according to claim 22, wherein the recording head comprises a plurality of discharge openings; and thermal energy generating means are provided respectively corresponding to the discharge openings, and further comprising inducing a state change in ink by heat generated by the thermal energy generating means to thereby discharge the ink from a respective discharge opening and to form a liquid droplet based on the state change.

26. A method according to claim 22, wherein the recording head discharges ink by generating thermal energy on the basis of a drive signal, and said controlling step comprises performing a drive control in such a manner that energy supplied to the recording head may be reduced when the detected receiving rate is high.

27. A recording method for use with a recording head for discharging ink from discharge openings by generating thermal energy, said method comprising steps of:
receiving an image signal;
detecting a recording frequency for driving a recording head by the received image signal; and
controlling driving of the recording head in such a manner that energy supplied to the recording head may be reduced when the detected recording frequency is high.

28. A method according to claim 27, wherein said controlling step comprises varying a drive signal for driving the recording head, according to the detected recording frequency.

29. A method according to claim 27, wherein said controlling step comprises varying the temperature of the recording head, according to the recording frequency.

30. A method according to claim 27, wherein the recording head comprises a plurality of discharge openings; and thermal energy generating means are provided respectively corresponding to the discharge openings, and further comprising inducing a state change in ink by heat generated by the thermal energy generating means to thereby discharge the ink from a respective discharge opening and to form a liquid droplet based on the state change.

31. An ink jet recording apparatus for forming an image by discharging liquid droplets from a small discharge opening to a recording material according to an entered image signal, said apparatus comprising:
a recording head for discharging ink from a discharge opening;
receiving means for receiving an image signal having a receiving rate; and
control means for controlling the recording head according to the receiving rate of the image signal.

32. An apparatus according to claim 31, wherein said recording head comprises a thermal energy generating element as an ink discharge energy generating element for inducing membrane boiling in ink, and said control means comprises means for varying a driving voltage applied to said thermal energy generating element according to the receiving rate of the image signal.

33. An apparatus according to claim 31, wherein said recording head comprises a thermal energy generating element as an ink discharge energy generating element for inducing membrane boiling in ink, and said control means comprises means for varying the temperature of said recording head according to the receiving rate of the image signal.

34. An apparatus according to claim 31, wherein said recording head comprises a thermal energy generating element as an ink discharge energy generating element for inducing membrane boiling in ink, and said control means comprises means for varying a driving frequency of said thermal energy generating element according to the receiving rate of the image signal.

35. An apparatus according to claim 31, wherein said control means comprises means for setting different driving conditions corresponding to different operating modes when said apparatus is connected to a main unit having a plurality of printing modes including at least a facsimile mode.

36. An apparatus according to claim 31, wherein said recording head discharges ink by generating thermal energy on the basis of a drive signal, and said drive control means performs a drive control in such a manner that energy supplied to said recording head may be reduced when the detected receiving rate is high.

37. An ink jet recording apparatus for effecting image recording with a recording head for discharging ink from discharge openings, said apparatus comprising:

a recording head for discharging ink from discharge openings;

reception means for receiving an image signal;

reception rate detecting means for detecting the receiving rate of the image signal received by said reception means; and drive control means for controlling said recording head according to the receiving rate detected by said detecting means.

38. An apparatus according to claim 37, wherein said recording head discharges ink by generating thermal energy on the basis of a drive signal, and said drive control means performs a drive control in such a manner that energy supplied to said recording head may be reduced when the detected receiving rate is high.

39. An ink jet recording apparatus for effecting image recording with a recording head for discharging ink from discharge openings by generating thermal energy, said apparatus comprising:

a recording head for discharging ink from discharge openings;

reception means for receiving an image signal;

recording frequency detecting means for detecting a recording frequency for driving said recording head by the image signal received by said reception means; and drive control means for controlling driving of the recording head in such a manner that energy supplied to the recording head may be reduced when the recording frequency detected by said detecting means is high.

* * * * *

UNITED STATES PATENT AND TRADEMARK OFFICE
CERTIFICATE OF CORRECTION

PATENT NO. : 5,223,937
DATED : June 29, 1993
INVENTOR(S) : Haruhiko Moriguchi, et al It is certified that error appears in the above-indentified patent and that said Letters Patent is hereby corrected as shown below:

<u>AT [57] ABSTRACT</u>:

Line 1, "in" should read --is--.

<u>COLUMN 1</u>:

Line 9, "as facsimile," should read --as a facsimile,--.

<u>COLUMN 3</u>:

Line 5, "by" should read --of the--.

<u>COLUMN 10</u>:

Line 6, "mean" should read --means--.

Signed and Sealed this

Sixteenth Day of May, 1995

Attest:

BRUCE LEHMAN

*Attesting Officer*     *Commissioner of Patents and Trademarks*